United States Patent [19]

Morris et al.

[11] Patent Number: 4,922,155

[45] Date of Patent: May 1, 1990

[54] PROTECTIVE CIRCUIT FOR REDUCED VOLTAGE LAMPS

[75] Inventors: Merle E. Morris; George B. Kendrick, both of Lexington; John M. Boyd, Nicholasville, all of Ky.

[73] Assignee: GTE Products Corporation, Danvers, Mass.

[21] Appl. No.: 209,769

[22] Filed: Jun. 22, 1988

[51] Int. Cl.$^5$ ............................................. H05B 37/04
[52] U.S. Cl. .................. 315/205; 315/200 R; 315/207; 315/74; 315/71
[58] Field of Search .................. 315/205, 200 R, 125, 315/207, 71, 74, 75, 51, 53; 307/157, 146

[56] References Cited

U.S. PATENT DOCUMENTS

| | | | |
|---|---|---|---|
| 2,928,024 | 3/1960 | Dawley | 315/205 |
| 3,274,426 | 5/1962 | Scoledge et al. | 313/318 |
| 3,275,922 | 9/1966 | Meyer et al. | 315/200 R |
| 3,823,339 | 7/1974 | Borneman et al. | 315/205 |
| 3,869,631 | 3/1975 | Anderson et al. | 315/200 R |
| 3,930,183 | 12/1975 | Harnden, Jr. | 315/71 |
| 4,119,888 | 10/1978 | Newell et al. | 315/205 |
| 4,229,680 | 10/1980 | Berlin, Jr. et al. | 315/200 R |
| 4,350,931 | 9/1982 | Niskin | 315/72 |
| 4,435,671 | 3/1984 | Wouk | 315/200 R |
| 4,480,211 | 10/1984 | Eggers | 315/70 |
| 4,480,212 | 10/1984 | Monahan et al. | 315/71 |
| 4,500,813 | 2/1985 | Weedall | 315/276 |

*Primary Examiner*—Eugene R. LaRoche
*Assistant Examiner*—Ali Neyzari
*Attorney, Agent, or Firm*—William E. Meyer

[57] ABSTRACT

A fail safe feature for long life reduced voltage lamps including diodes is disclosed. As known, a low wattage lamp may designed for longer life by using a lower root mean square design voltage. The root means square voltage of the alternating source current may be lowered by including a rectifying element, and a fuse may be included in series with the lamp to safely interrupt the circuit. By further including a one-way shunt oriented oppositely to the rectifier, in parallel with the lamp, and intermediate the rectifier and fuse, on failure of rectifier, unrectified current blows the fuse. If the rectifying diode fails, substantially all of the current is shunted to the fuse during the failed half of the current cycle, thereby blowing the fuse, and safely failing the lamp.

13 Claims, 2 Drawing Sheets

PROTECTIVE CIRCUIT FOR REDUCED VOLTAGE LAMPS

TECHNICAL FIELD

The invention relates to electric lamps and particularly to electric circuit portions of electric lamps. More particularly the invention is concerned with a fail safe circuit for electric lamps including a rectifying device.

BACKGROUND ART

Incandescent lights have a longer life when operated at a lower voltage. A growing practice is to include a voltage reduction device such as a rectifier to reduce the root mean square voltage. A rectifier converts the alternating current commonly available to direct current, and lowers the root mean square operating voltage to approximately the peak voltage of the alternating current divided by the square root of two. One inexpensive method of rectifying the current is to include a diode in series with the electric lamp. The filament coil may then be redesigned for the lowered voltage to be more resistant to shock and to have a longer life. The result is increased lamp life.

U.S. Pat. No. 3,823,339 to Edmond H. Borneman et al. and U.S. Pat. No. 4,229,680 to Donald M. Berlin Jr. et al. show diode devices designed to be inserted in a lamp socket prior to the insertion of the lamp. The insert is then designed to generally convert the available alternating current to direct current for any subsequently inserted lamp. The reduced voltage increases lamp life, but also affects the quality of the light output, and in particular lowers the color temperature of the light. In summary, the lamps used with the insert are not redesigned to optimize the change in current and voltage.

Unfortunately, diodes can fail. One failure mode is due to large line surges which occasionally occur. One estimate is that a large line surge occurs about one thousandth of one percent (0.001%) of the lifetime of a lamp with a life of 3,000 hours. Line surge faults affect all lamps, regardless of type or mounting configuration. U.S. Pat. No. 3,930,183 to John D. Harnden, Jr teaches, the inclusion of a varistor material to protect a lamp filament against line surges. Varistor materials have resistances that decrease with increasing voltages, but there is no difference with respect to polarity. Varistors are then not useful in generally lowering the voltage.

A second failure mode is due to overheating. Many lamps are designed to achieve the maximum light output for a particular lifetime by maximizing the wattage for the filament. As a result, many lamps run fairly close to their temperature limits under normal conditions. Additional heat may lead to failure. A lamp enclosed in a small space may be operated for a sufficiently long time to heat the surrounding volume to above the critical temperature of the rectifier. Alternatively, the environment of the lamp may be heated by exterior heat sources, again to the point of stressing the lamp components beyond their critical limits.

The rectifiers currently used for rectification from alternating to direct current operate well up to about 225° C. If the rectifier should fail, as for example in a closed in fixture, the voltage seen by the lamp rises from the rectified line level, of for example 84 volts, to the normal, unrectified line level, of for example 120 volts. The filament as a result runs hotter In some instances, the hotter running filament fails quickly In other instances, the filament may not fail for many hours at the higher wattage. As a result, heating increases and another portion of the lamp, or socket may fail instead of the filament. When lamp jacket, socket or other nearby elements fail, there is the possibility of containment failure or even fire. Known fire tests, called cheese cloth tests, have shown that a lamp with a rectifier that normally passes the test, may fail the cheese cloth test when the rectifier fails in a shorted mode causing a voltage increase and therefore a heat increase There is a need to detect failure of a rectification device, and a corresponding need to respond to the failure of the rectification device. There is a need to provide a safety mechanism in a rectified current lamp. Electric lamps are relatively inexpensive, and mass produced. Accordingly, the solution to the safety problem needs to be both inexpensive and capable of mass production. Complex components and circuit systems are then inappropriate for the solutions sought. Furthermore, simplicity of manufacture is important to overall cost and reliability.

DISCLOSURE OF THE INVENTION

A reduced voltage lamp may be made with a protective circuit to include an electric lamp with an input lead and output lead, and voltage reduction means connected to the input lead in series with the lamp for reducing the root mean square voltage. A shunt means may be connected between the input lead and output in parallel with the lamp that is responsive to the voltage reduction means for allowing substantial voltage to be supplied to the lamp while the voltage reduction means substantially reduces the voltage, and for shunting voltage around the lamp while the voltage reduction means fails to substantially reduce the voltage supplied to the lamp. A circuit interrupt means is further included which is connected in series with the lamp and responsive to the shunt means for interrupting the lamp circuit when substantial voltage is shunted around the lamp. As a result, voltage passing to the lamp on failure of the voltage reduction means is substantially shunted to the circuit interrupt to interrupt the circuit safely taking the lamp out of service.

BEST MODE FOR CARRYING OUT THE INVENTION

Figure 1:
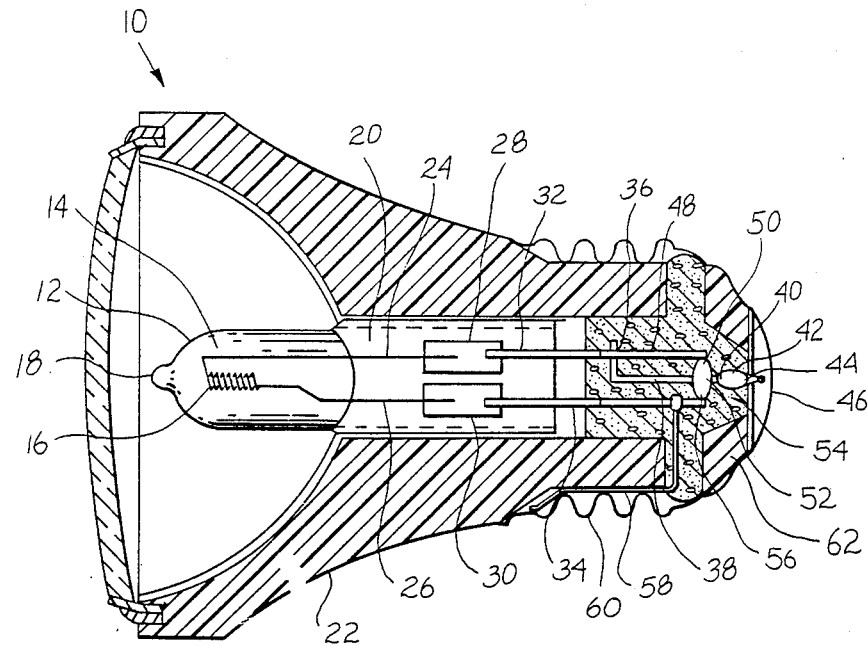
FIG. 1 shows a front view partially cut away of a preferred embodiment of a rectified current lamp with a protective circuit.

FIG. 1 shows a front view partially cut away of a preferred embodiment of a lamp including a rectifier and a protective circuit 10. The lamp shown is typical of a press sealed tungsten halogen lamp. The lamp includes a lamp envelope 12, an enclosed volume 14, a lamp filament 16, and an electrical connection for the lamp filament 16. The envelope 12 is tipped at one end 18, encloses the lamp volume 14 in the middle, and at the opposite end has a press seal 20 for the electrical connection. The tungsten halogen envelope 12 may be further enclosed in an outer protective housing 22 conveniently chosen to include features related the expected use of the lamp. The applicants have enclosed a tungsten halogen lamp with a protective circuit in a ceramic parabolic reflector base with a glass lens.

The lamp volume 14 typically encloses a vacuum, gas, or gas and halogen environment. Positioned centrally in the lamp volume 14 is the filament 16, which may be a coiled tungsten wire. The filament 16 is electrically connected through the press seal 20 to exterior electrical components. Extending into the press seal 20 are filament ends 24, 26, where they join molybdenum foil elements 28, 30. The foil elements 28, 30 may be the commonly known feather edged foils that forgive expansion mismatch in the metal to glass seal. The foil elements 28, 30 then connect to two exit wires which in turn pass to the exterior of the envelope 12.

One exit wire is a current input 32, while the other wire is a current output 34. The current input 32 joins a welded junction 36 of two leads. A first junction lead 38 receives current from a cathode side 40 of a rectifier 42 which may be a diode. The anode side 44 of the rectifier 42 connects to a base contact 46 centrally located in a threaded male connector. The base contact 46 is designed to receive current from a first alternating current lead. The second junction lead 48 is joined to a blocking cathode side 50 of a one-way shunt 52. The rectifier 42 and one-way shunt 52 in the preferred embodiment are enclosed in an insulating cement 54 adjacent the base contact 46.

The current output 34 is joined to the opposite side of the one-way shunt 52, anode side 56. The one-way shunt 52 is then connected in parallel with the lamp filament 16 and between the current input 32, and the current output 34. The orientation of the one-way shunt 52 normally blocks current from the current input 32 from flowing directly to the current output 34, forcing current to pass by way of the lamp filament 16. The substantial voltage supplied then allows the lamp to light. The current output 34 is also connected in series with a circuit opening device such as fuse 58 which may in turn be connected to the threaded contact 60. In the preferred embodiment shown, the fuse 58 is a fusible link extending at one end from the current output 34, and may be connected for example by soldering or welding the other fuse end to the threaded contact 60 of a male lamp connector. The threaded contact 60 is designed to connect with a second alternating current lead. Positioned between the base contact 46 and threaded contact 60 is insulating material 62. The applicants have lead the fuse 58 between the ceramic reflector base and insulating material 62 to the threaded contact 60.

Figure 2:
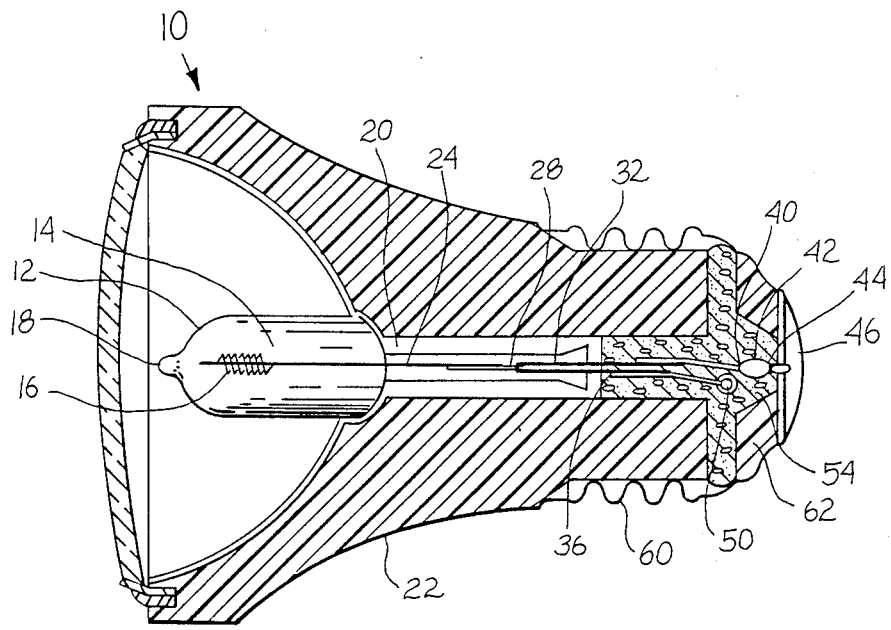
FIG. 2 shows a side view partially cut away of a preferred embodiment of a rectified current lamp with a protective circuit.

FIG. 2 shows a side view, partially cut away, of a preferred embodiment of a lamp including a rectifier and a protective circuit. The view is one rotated o from the view in FIG. 1. The current input 32, and first junction lead 38 can be seen to extend approximately axially to the rectifier 42 which is adjacent the base contact 46. The shunt 52 may be axially offset from but adjacent the current input 32 to allow connection between the cathode side 50 of the shunt 52 and the second junction lead 48. The second junction lead 48 physically parallels the current output 34, and is therefore behind (not visible) the current output 34 as seen in the view of FIG. 2. The shunt 52 may be positioned close enough to the base contact 46 to be enclosed in the cement 54.

Figure 3:
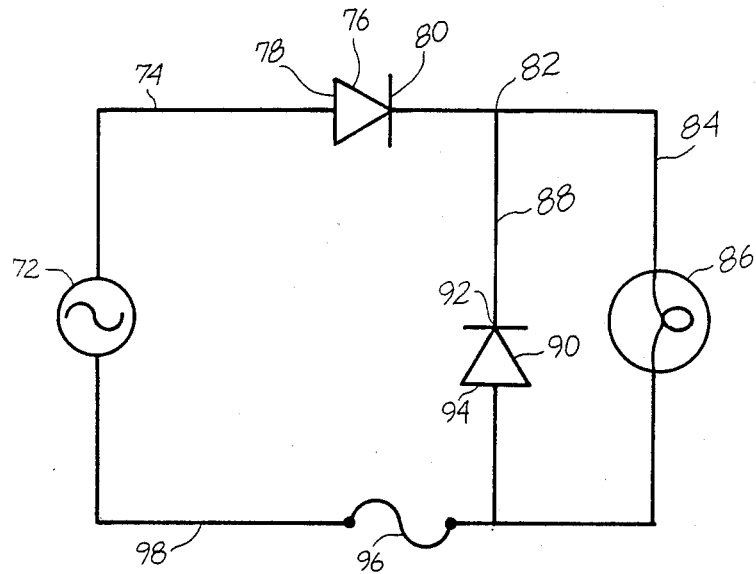
FIG. 3 shows a circuit diagram for a preferred embodiment of a rectified current lamp including a protective circuit.

FIG. 3 shows a circuit diagram for a preferred embodiment of a rectified current lamp with a protective circuit. Alternating current from a source 72 is provided by a first alternating current lead 74 connected to a rectifier 76. The rectifier 76 may be a diode whose anode side 78 is joined to the first current lead 74. On the first half of the alternating current cycle, current proceeds from the source 72, through the rectifier 76 via a cathode side 80 to a junction 82 where a first junction lead 84 passes to the lamp filament 86. A second junction lead 88 connects to a blocking side of a one-way shunt 90 which may be a the cathode 92 of a diode. Normally current passes from the rectifier 76 through the lamp filament 86, and is blocked from passing on the second junction lead 88 by the one-way shunt 90. The current passes through the lamp filament 86 to join with an anode side 94 of the shunt 90, and a circuit opening device shown as fuse 96 positioned in series with the lamp filament 86 and the shunt 90. The fuse 96 joins a second alternating current lead 98 returning to the source 72, so current normally passes from the lamp filament 86 through the fuse 96 to the source 72. The substantial voltage supplied then allows the lamp to light.

During the second half of the alternating current cycle, the rectifier 76 normally blocks the current, so no current passes from the fuse 96 to either the lamp filament 86 or the shunt 90.

If the rectifier 76 fails in a shorted failure mode due to excessive heat, or other causes, current in the first half of the cycle passes normally. During the second half of the cycle, failure of the rectifier 76 is sensed by the one-way shunt 90, since current is not blocked by the rectifier 76, and passes from both the lamp filament 86 and the one-way shunt 90 to the rectifier 76. The failure of the rectifier 76 is responded to by the one-way shunt 90, since the one-way shunt 90 readily passes current in the direction from the fuse 96 to the failed rectifier 76. Substantially all of the current passes from the fuse 96 via the shunt 90 to the rectifier 76. Little of the second half cycle current passes via the lamp filament 86. Substantially all the current then passes directly through the fuse 96. The fuse 96 opens, disconnecting the rectifier 76, lamp filament 86 and shunt 90 from further operation. As a result, no further heating of the lamp, socket, or other surrounding elements may occur, and the lamp is safely taken out of operation.

Figure 4:
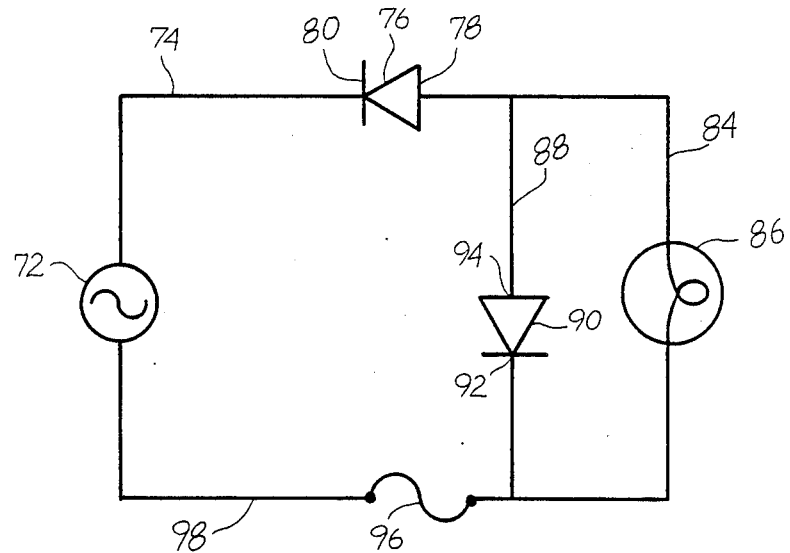
FIG. 4 shows an alternative preferred circuit design for a rectified current lamp including a protective circuit.

Since, diode protected lamps can have a slight flicker, it may be esthetic to coordinate two or more diode protected lamps to flicker during opposite phases of the current cycle. Two lamps in combination can then cooperate to reduce perceived flicker. Equivalent results for the circuit of FIG. 3 may be obtained by oppositely orienting the rectifier 76 and one-way shunt 90 directions, as seen in FIG. 4 which shows an alternative preferred circuit design for a rectified current lamp with a protective circuit. The difference is that a different phase of the current cycle passes the lamp filament 86 for the circuit of FIG. 4. The first half of the alternating current cycle is blocked by the rectifier 76, while the second half is allowed to pass through the lamp filament 86 but not the one-way shunt 90. As a result, current flows in the opposite direction, so the input wire in effect becomes the lamp output, and the output wire becomes the lamp input. The lamp works in the same manner with the fuse 96 disconnecting the lamp on rectifier 76 failure. It is therefore anticipated that both circuit designs shown in FIGS. 3 and 4 would be manufactured to provide complementary flickering lamps.

A useful byproduct of the present design is that the one-way shunt 90, when in the form of a diode, acts as a second temperature sensitive switch. If the one-way shunt 90 fails in a shorted mode due to heat or for other causes, the normal current flow is not blocked by the one-way shunt 90, but substantially all of the current flows directly via the fuse 96. The lamp filament 86 is bypassed, and the fuse 96 opens, safely taking the lamp out of service.

The fuse may alternatively be positioned in the circuit in series with the rectifier either intermediate the source 72 and the rectifier 76, or intermediate the rectifier 76 and junction 82 to be in series with both the lamp filament 86 and shunt 90. In each case, the fuse 96 is connected in series with the lamp filament 86 and the shunt 90. Applicants have found enclosing the fuse 96 in the cement may be acceptable, especially where the cement is somewhat porous.

In a working example of a reduced voltage tungsten halogen lamp, high temperature, metallurgically bonded diodes were used for the rectifier and the one-way shunt. Some of the features of the diodes were approximately as follows: the maximum recurrent peak voltage was 400 volts, and the maximum root mean square voltage was 280 volts. The direct current blocking voltage was 400 volts. The peak forward surge current was 50 amperes, and the maximum full load reverse current was 100 microamperes. The diodes operating temperature ranged from −65° to +175° C. The lamp was designed to operated from a 120 volt alternating current source, while the filament was designed for 84.85 volts direct current. At various times, the rectifier, that is the series diode, was intentionally shorted out. In every case tested, the protective one-way shunt, the lamp parallel diode, shut the lamp down by causing the fuse to open. The disclosed operating conditions, dimensions, configurations and embodiments are presented as examples only, and other suitable configurations and relations may be used to implement the invention.

While there have been shown and described what are at present considered to be the preferred embodiments of the invention, it will be apparent to those skilled in the art that various changes and modifications can be made herein without departing from the scope of the invention defined by the appended claims.

What is claimed is:

1. A reduced voltage lamp with a protective circuit comprising:
   (a) an electric lamp having an input lead and output lead as parts of a lamp circuit,
   (b) voltage reduction means connected to the input lead in series with the lamp for reducing the root mean square voltage,
   (c) a shunt means connected between the input lead and output in parallel with the lamp and responsive to the voltage reduction means for allowing substantial voltage to be supplied to the lamp while the voltage reduction means substantially reduces the voltage, and for shunting current around the lamp while the voltage reduction means fails to substantially reduce the voltage supplied to the lamp, and
   (d) a circuit interrupt means connected in series with the lamp and responsive to the shunt means for interrupting the lamp circuit when substantial current is shunted around the lamp on failure of the voltage reduction means.

2. A reduced voltage lamp with a protective circuit comprising:
   (a) an electric lamp having an input lead and output lead as parts of a lamp circuit,
   (b) a voltage reduction rectifying means connected to the input lead in series with the lamp for converting alternating current to direct current in a first direction reducing the root mean square voltage,
   (c) a one-way shunt connected between the input lead and output lead in parallel with the lamp for shunting current opposite the first direction, and
   (d) a circuit interrupt means connected in series with the lamp and responsive to the shunt means for interrupting the lamp circuit when substantial current is shunted around the lamp on failure of the voltage reduction means.

3. The lamp in claim 1, wherein the voltage reduction means is a rectifying diode having a cathode and an anode side.

4. The lamp in claim 3, wherein the cathode side of the rectifying diode is joined in series with a current lead to the lamp and the anode side of the rectifying diode is joined in series with the lamp and the shunt.

5. The lamp in claim 3, wherein the anode side of the rectifying diode is joined in series with a current lead to the lamp and the cathode side of the rectifying diode is joined in series with the lamp and the shunt.

6. The lamp in claim 1, wherein the shunt means is a diode having a cathode and anode side.

7. The lamp in claim 6, wherein the cathode side of the shunting diode is connected in series with the voltage reduction means, and in parallel with the input lead of the lamp, and the anode side of the shunting diode is connected in parallel with the output lead of the lamp.

8. The lamp in claim 6, wherein the anode side of the shunting diode is connected in series with the voltage reduction means, and in parallel with the input lead of the lamp, and the cathode side of the shunting diode is connected in parallel with the output lead of the lamp.

9. The lamp in claim 1, wherein the rectifying diode and shunting diode are enclosed in an insulating cement.

10. The lamp in claim 1, wherein the circuit interruption means is a fuse.

11. The lamp in claim 1, wherein the rectifying means, shunt means and fuse are enclosed in a lamp housing.

12. A reduced voltage lamp with a protective circuit comprising:
   (a) an electric lamp having an input lead and output lead as parts of a lamp circuit
   (b) voltage reduction means connected to the input lead in series with the lamp for reducing the root mean square voltage,
   (c) a shunt means connected between the input lead and output to be in parallel with the lamp and responsive to temperature for allowing substantial voltage to be supplied to the lamp while the temperature is below a safe level, and for shunting current around the lamp while the temperature is above an unsafe level, and
   (d) a circuit interrupt means connected in series with the lamp and responsive to the current shunt means for interrupting the lamp circuit on a unsafe temperature level to interrupt the lamp circuit.

13. A reduced voltage lamp with a protective circuit comprising:

(a) an electric lamp having an input lead and output lead as parts of a lamp circuit,
(b) voltage reduction diode connected to the input lead in series with the lamp for reducing the root mean square voltage,
(c) a shunt diode connected between the input lead and output in parallel with the lamp and responsive to the voltage reduction diode for allowing substantial voltage to be supplied to the lamp while the voltage reduction diode substantially reduces the voltage supplied to the lamp, and for shunting current around the lamp while the voltage reduction diode fails to substantially reduce the voltage supplied to the lamp, and
(d) a circuit interrupt fuse connected in series with the lamp and responsive to the shunt diode for interrupting the lamp circuit on failure of the voltage reduction diode.

* * * * *